United States Patent [19]
Arai

[11] Patent Number: 4,945,206
[45] Date of Patent: Jul. 31, 1990

[54] BEAM BENDER FOR USE IN A LASER-BEAM MACHINING APPARATUS

[75] Inventor: Takeji Arai, Yamanashi, Japan

[73] Assignee: Fanuc Ltd., Minamitsuru, Japan

[21] Appl. No.: 350,708

[22] PCT Filed: Sep. 3, 1988

[86] PCT No.: PCT/JP88/00893
§ 371 Date: Apr. 28, 1989
§ 102(e) Date: Apr. 28, 1989

[87] PCT Pub. No.: WO89/02336
PCT Pub. Date: Mar. 23, 1989

[30] Foreign Application Priority Data
Sep. 16, 1987 [JP] Japan .................. 62-231854

[51] Int. Cl.$^5$ .................................. B23K 26/00
[52] U.S. Cl. ...................... 219/121.74; 219/121.78
[58] Field of Search .............. 219/121.73, 121.74, 219/121.78, 121.79, 121.80, 121.81; 350/632

[56] References Cited

U.S. PATENT DOCUMENTS 4,574,180  3/1986  Kasner et al. .......... 219/121.77 X
4,667,080  5/1987  Jüptner et al. .......... 219/121.74

FOREIGN PATENT DOCUMENTS 0028094  2/1987  Japan .......... 219/121.74

Primary Examiner—C. L. Albritton
Attorney, Agent, or Firm—Staas & Halsey

[57] ABSTRACT

A beam bender for changing the direction of a laser-beam in a laser-beam machining apparatus which comprises a base (1), a flange (2), a light-guide member (5), and a mirror holder (6) housing a bender mirror (7). Depending on the direction from which the laser beam is applied to the beam bender, the flange (2) may be removed and moved to another side of the base and the light-guide member (5) rotated to orient the bender mirror (7) in the direction from which the laser beam is applied.

2 Claims, 4 Drawing Sheets

BEAM BENDER FOR USE IN A LASER-BEAM MACHINING APPARATUS

TECHNICAL FIELD

The present invention relates to a beam bender for changing the direction of a laser beam in a laser-beam machining, apparatus and more particularly to a beam bender which can bend a laser beam even if the direction from which the laser beam is applied thereto is varied.

BACKGROUND ART

In laser-beam machining apparatus, a laser beam produced by a laser oscillator is deflected by a beam bender and then focused onto a workpiece by a lens.

FIG. 6 of the accompanying drawings schematically shows the relationship between the laser oscillator and the beam bender. The laser oscillator, denoted at 20, is supplied with a laser gas through a gas pipe 21 and also with cooling water through a cooling water pipe 22 for cooling the laser oscillator 20 itself and a bender mirror. A laser-beam machining table 23 has a workpiece 27 thereon. A beam bender 24 serves to deflect a laser beam generated by the laser oscillator, in a direction 6 so as to apply the deflected laser beam to the workpiece 27 on the table 23.

In some applications, the laser oscillator should be placed on the righthand side of the beam bender as indicated by the two-dot-and-dash lines in FIG. 6, owing to limitations imposed by the space where the laser-beam machining apparatus is installed and positional limitations of the gas pipe 21 and the cooling water pipe 22.

The beam bender 24 is arranged to bend the laser beam which is applied thereto only in one direction, i.e. Therefore, if the laser oscillator is positioned on the righthand side of the beam bender 24, the beam bender 24 has to be designed again to meet the different positional requirement. However, it is tedious and time-consuming to design and manufacture a beam bender all over again to meet the requirements of a specific location where the laser-beam machining apparatus is placed of time required to customize the beam bender.

DISCLOSURE OF THE INVENTION

It is an object of the present invention to provide a beam bender which can bend a laser beam in laser-beam machining even when the direction which the laser beam is applied is varied.

To solve the above problems, there is provided in accordance with one embodiment of the invention, a beam bender for changing the direction of a laser beam in a laser-beam machining apparatus, comprising:

a base having a circular hole;
a flange screwed to said base;
a hollow light-guide member of an inverted L shape having one end rotatably inserted in said hole and an opposite end movably held against said flange;
a mirror holder fixed to said light-guide member; and
a bender mirror mounted on said mirror holder, said mirror holder having a fine adjustment mechanism for adjusting the direction of said bender mirror.

According to another embodiment of the invention, there is provided a beam bender for changing the direction a laser beam in a laser-beam machining apparatus comprising:

a base having a rectangular hole;
a flange screwed to said base;
a hollow light-guide member of an inverted L shape having one end inserted in said hole and removable therefrom depending on the direction in which the laser beam is applied, and an opposite end movably held against said flange;
a mirror holder fixed to said light-guide member; and
a bender mirror mounted on said mirror holder, said mirror holder having a fine adjustment mechanism for adjusting the direction of said bender mirror.

Depending on the direction in which the laser beam is applied to the beam bender, the flange on the base is displaced toward an opposite side and the light-guide member is rotated to orient the bender mirror in the direction in from which the laser beam is applied.

Alternatively, the flange on the base is displaced toward an opposite side, and the light-guide member is removed from the hole, rotated in the opposite direction, and inserted again into the hole to orient the bender mirror in the direction from which the laser beam is applied.

BEST MODE FOR CARRYING OUT THE INVENTION

Embodiments of the present invention will hereinafter be described with reference to the drawings.

Figure 1:
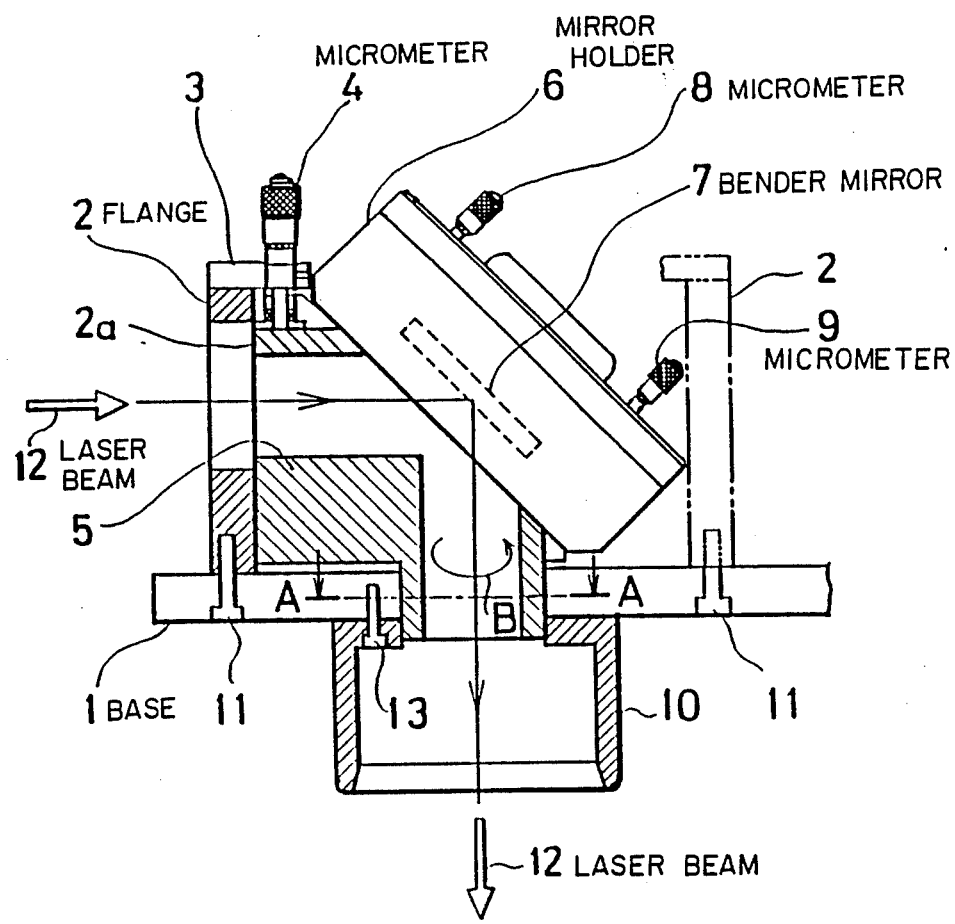
FIG. 1 is an elevational view, partly in cross section, of a beam bender according to a first embodiment of the present invention.

FIG. 1 shows a beam bender according to a first embodiment of the present invention. The beam bender includes a base 1 having a central hole defined therein. A flange 2 is fastened to the base 1 by a screw 11 and has a side 2a against which a light-guide member (described below) is slidably held. A micrometer 4 is fixed to a member 3 mounted on an upper surface of the flange 2. A light-guide member 5 having an inverted L shape and has a hollow structure for allowing a laser beam 12 to pass therethrough. The light-guide member 5 has a surface held vertically slidably against the side 2a of the flange 2, and be slid vertically by the micrometer 4.

A mirror holder 6 is fixed to the light-guide member 5 and houses a bender mirror 7 therein. The mirror holder 6 is adjustable in small angular increments with respect to the light-guide member 5 by means of micrometers 8, 9 to adjust the angle of the bender mirror 7 for adjusting the guide passage for the laser beam 12 in the light-guide member 5. A flange 10 is fastened to the lower surface of the base 1 by means of a screw 13. A cooling structure for the bender mirror 7 is omitted from the illustration.

Figure 2:
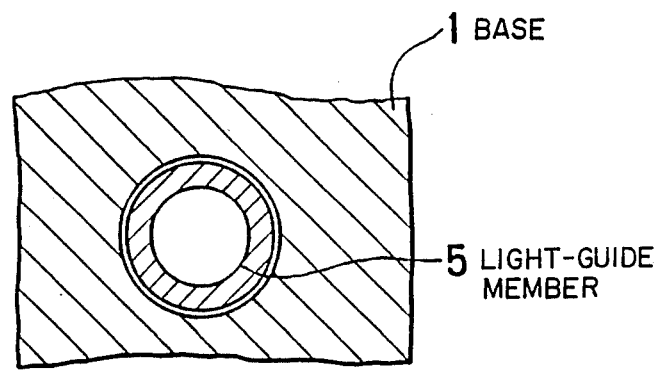
FIG. 2 is a cross-sectional view taken along line A—A of FIG. 1.

FIG. 2 shows the cross section a the beam bender taken along line A—A of FIG. 1. While the base 1 and the light-guide member 5 are shown as being spaced from each other, they are actually held in intimate contact with each other but rotatable relatively to each other.

When the direction in which the laser beam is applied is changed from left to right because of requirements of the laser-beam machining apparatus, the screw 11 is removed to release the flange 2, the light-guide member 5 is rotated in the direction indicated by the arrow B, and the flange 2 is fixed to the base 1 by the screw 11 as shown by the two-dot-and-dash lines in FIG. 1.

Figure 3:
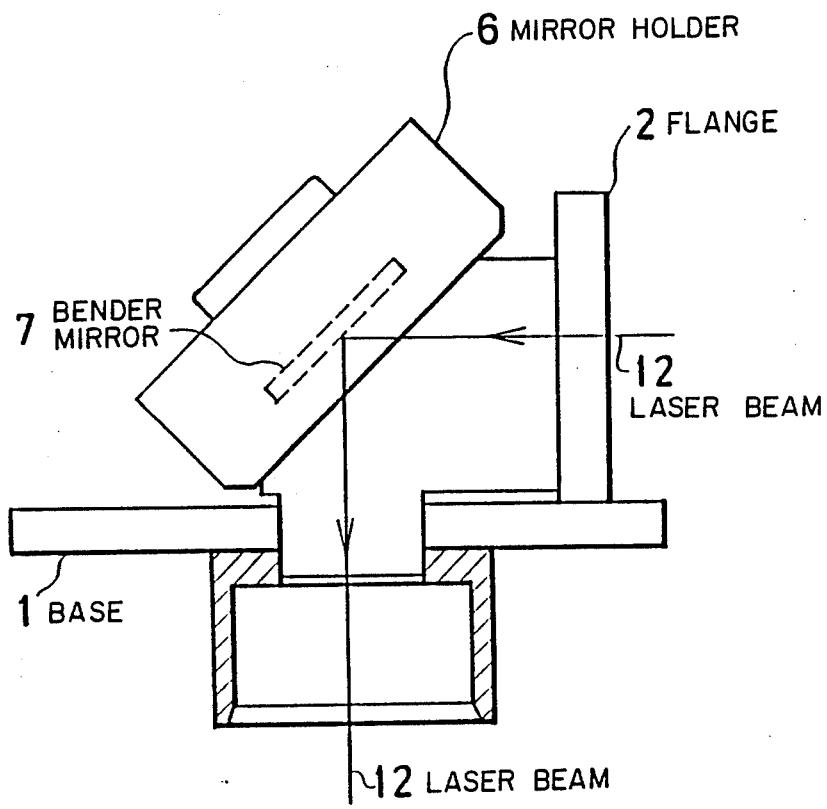
FIG. 3 is an elevational view of the beam bender with a mirror holder and a flange positioned on the righthand of the mirror holder.

Now the bender mirror 7 is directed to the right, as shown in FIG. 3. The laser beam 12 is applied from the right and deflected by the bender mirror 7. Therefore, requirements of the laser-beam machining apparatus for placing the laser oscillator on the righthand side of the beam bender can easily be met.

Figure 4:
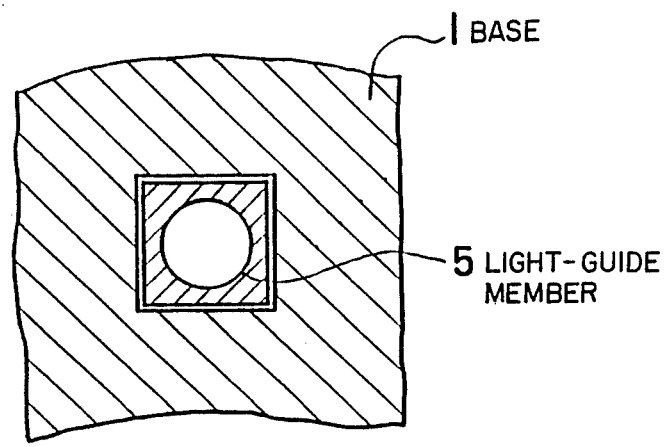
FIG. 4 is a cross-sectional view of a light-guide member and a base according to a second embodiment of the present invention.

A second embodiment of the present invention will be described below. According to the second embodiment, a light-guide member 5 and a base 1 are coupled to each other through a square hole defined in the base 1, as shown in FIG. 4 which corresponds to the cross section of the beam bender taken along line A—A of FIG. 1. The base 1 and the light-guide member 5 are shown as being spaced from each other by a gap which is shown as being larger than actual. When the direction in which the laser beam is applied is changed, the screw 11 is removed, the flange 2, the light-guide member 5, and the mirror holder 6 are pulled upwards, oriented to the right, and inserted again, and the flange 2 is fastened to the base 1 on an opposite side.

Figure 5:
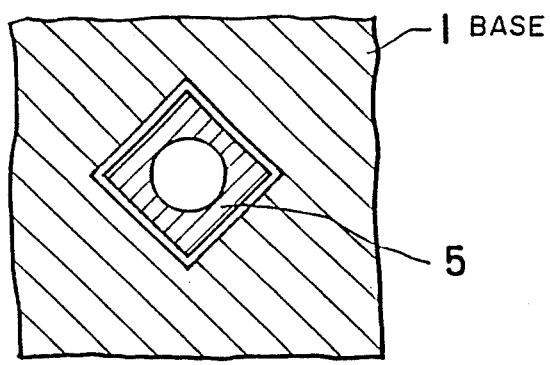
FIG. 5 is a cross-sectional view of a light-guide member and a base according to a third embodiment of the present invention.

A third embodiment of the present invention will be described below. The third embodiment is shown in FIG. 5 which corresponds to the cross section of the beam bender taken along line A—A of FIG. 1. The third embodiment differs from the second embodiment in that the hole in the base and the light-guide member 5 are angularly displaced 45° although they are of the same square configuration as in the second embodiment. With this arrangement, wobbling movement of the light-guide member 5 in the vertical and horizontal directions in FIG. 5 can be reduced.

In the above embodiments, the beam bender can be adjusted to bend a laser beam when it is applied from different directions such as leftward or rightward. However, the beam bender can also be adjusted to bend a laser beam which may be applied in any one of four directions, i.e., forward, rearward, leftward, and rightward directions.

With the present invention, as described above, depending on the direction from which the laser beam is applied to the beam bender, the flange on the base is displaced toward an opposite side and the light-guide member is rotated to orient the bender mirror in the direction from which the laser beam is applied. Therefore, the same beam bender can be used in laser-beam machining apparatus in which laser beams are applied from different directions.

Alternatively, the flange on the base is displaced toward an opposite side, and the light member is removed from the hole, rotated in the opposite direction, and inserted again into the hole to orient the bender mirror in the direction from which the laser beam is applied. Accordingly, the beam bender can easily meet different directions in which the laser beam is applied.

I claim:

1. A beam bender for changing the direction of a laser beam in a laser-beam machining apparatus, comprising:
    a base having a circular hole;
    a removable flange screwed to said base;
    a hollow light-guide member of an inverted L shape having one end rotatably inserted in said hole and an opposite end movably held against said flange whereby when said flange is removed from said base, said light-guide member may be rotated in said hole;
    a mirror holder fixed to said light-guide member;
    a bender mirror mounted on said mirror holder, said mirror holder having a fine adjustment mechanism for adjusting the angle of said bender mirror.

2. A beam bender for changing the direction of a laser beam in a laser-beam machining apparatus, comprising:
    a base having a rectangular hole;
    a removable flange screwed to said base;
    a hole light-guide member of an inverted L shape having one end inserted in said hole and an opposite end movably held against said flange;
    said light-guide member being removable from said hole and its orientation changed to conform to the direction from which said laser beam is applied;
    a mirror holder fixed to said light-guide member; and
    a bender mirror mounted on said mirror holder, said mirror holder having a fine adjustment mechanism for adjusting the angle of said bender mirror.

* * * * *

UNITED STATES PATENT AND TRADEMARK OFFICE
CERTIFICATE OF CORRECTION

PATENT NO. : 4,945,206

DATED : July 31, 1990

INVENTOR(S) : TAKEJI ARAI

Figure 6:
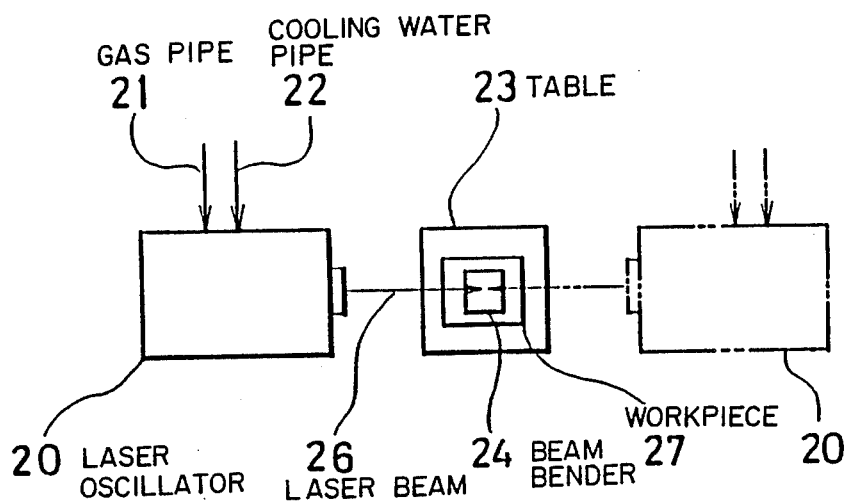
FIG. 6 is a schematic view showing the relationship between a laser oscillator and a beam bender.

It is certified that error appears in the above-identified patent and that said Letters Patent is hereby corrected as shown below:

Column 1, line 36, after "i.e." insert --from the left as shown in FIG. 6.--;

line 44, delete "of time rquired to customize the beam bender";

line 50, after "direction" insert --from--;

line 67, after "tion" insert --of--, after "apparatus" insert a comma --,--.

UNITED STATES PATENT AND TRADEMARK OFFICE
CERTIFICATE OF CORRECTION

Page 2 of 2

PATENT NO. : 4,945,206
DATED : July 31, 1990
INVENTOR(S) : Takeji Arai

It is certified that error appears in the above-identified patent and that said Letters Patent is hereby corrected as shown below:

Column 2, line 16, delete "in";

line 54, delete "and".

Column 3, line 1, "the" (first occurrence) should be --a--.

line 40, after "45°" insert a comma --,--.

\* Column 4, line 30, after "member;" insert --and--;

\* line 38, "hole" should be --hollow--.

Signed and Sealed this

Twenty-second Day of October, 1991

Attest:

HARRY F. MANBECK, JR.

Attesting Officer     Commissioner of Patents and Trademarks